(12) United States Patent
Schwab et al.

(10) Patent No.: US 9,350,278 B1
(45) Date of Patent: May 24, 2016

(54) CIRCUIT TECHNIQUE TO INTEGRATE VOICE COIL MOTOR SUPPORT ELEMENTS

(71) Applicant: Western Digital Technologies, Inc., Irvine, CA (US)

(72) Inventors: Richard A. Schwab, Laguna Hills, CA (US); John R. Agness, Laguna Hills, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 77 days.

(21) Appl. No.: 14/304,718

(22) Filed: Jun. 13, 2014

(51) Int. Cl.
*G05B 5/00* (2006.01)
*H02P 6/00* (2016.01)

(52) U.S. Cl.
CPC .................................... *H02P 6/006* (2013.01)

(58) Field of Classification Search
CPC ......... H02K 41/03; G05F 3/262; G05F 3/222; H03L 7/0896
See application file for complete search history.

(56) References Cited

U.S. PATENT DOCUMENTS

| | | | |
|---|---|---|---|
| 5,773,991 A | 6/1998 | Chen | |
| 5,956,201 A | 9/1999 | Pham et al. | |
| 6,014,283 A | 1/2000 | Codilian et al. | |
| 6,052,076 A | 4/2000 | Patton, III et al. | |
| 6,052,250 A | 4/2000 | Golowka et al. | |
| 6,067,206 A | 5/2000 | Hull et al. | |
| 6,078,453 A | 6/2000 | Dziallo et al. | |
| 6,091,564 A | 7/2000 | Codilian et al. | |
| 6,094,020 A | 7/2000 | Goretzki et al. | |
| 6,101,065 A | 8/2000 | Alfred et al. | |
| 6,104,153 A | 8/2000 | Codilian et al. | |
| 6,122,133 A | 9/2000 | Nazarian et al. | |
| 6,122,135 A | 9/2000 | Stich | |
| 6,141,175 A | 10/2000 | Nazarian et al. | |
| 6,160,368 A | 12/2000 | Plutowski | |
| 6,181,502 B1 | 1/2001 | Hussein et al. | |
| 6,195,222 B1 | 2/2001 | Heminger et al. | |
| 6,198,584 B1 | 3/2001 | Codilian et al. | |
| 6,198,590 B1 | 3/2001 | Codilian et al. | |
| 6,204,988 B1 | 3/2001 | Codilian et al. | |
| 6,243,223 B1 | 6/2001 | Elliott et al. | |
| 6,281,652 B1 | 8/2001 | Ryan et al. | |
| 6,285,521 B1 | 9/2001 | Hussein | |
| 6,292,320 B1 | 9/2001 | Mason et al. | |
| 6,310,742 B1 | 10/2001 | Nazarian et al. | |
| 6,320,718 B1 | 11/2001 | Bouwkamp et al. | |
| 6,342,984 B1 | 1/2002 | Hussein et al. | |
| 6,347,018 B1 | 2/2002 | Kadlec et al. | |
| 6,369,972 B1 | 4/2002 | Codilian et al. | |
| 6,369,974 B1 | 4/2002 | Asgari et al. | |
| 6,462,896 B1 | 10/2002 | Codilian et al. | |
| 6,476,996 B1 | 11/2002 | Ryan | |

(Continued)

*Primary Examiner* — Karen Masih

(57) ABSTRACT

A current sensing circuit includes: a first controlled device; a first controlled device; a first current mirror configured to cause a first mirror current to flow through a first load device based on a first control signal received by the first controlled device; a second controlled device; a second current mirror configured to cause a second mirror current to flow through a second load device based on a second control signal received by the second controlled device; and an amplifier configured to output a voltage signal based on the first mirror current flowing through the first load device and the second mirror current flowing through the second load device. The first control signal is substantially proportional to a first drive signal applied to a first controlled remote device, and the second control signal is substantially proportional to a second drive signal applied to of a second controlled remote device.

27 Claims, 4 Drawing Sheets

(56) References Cited

U.S. PATENT DOCUMENTS

| | | |
|---|---|---|
| 6,484,577 B1 | 11/2002 | Bennett |
| 6,493,169 B1 | 12/2002 | Ferris et al. |
| 6,496,324 B1 | 12/2002 | Golowka et al. |
| 6,498,698 B1 | 12/2002 | Golowka et al. |
| 6,507,450 B1 | 1/2003 | Elliott |
| 6,534,936 B2 | 3/2003 | Messenger et al. |
| 6,538,839 B1 | 3/2003 | Ryan |
| 6,545,835 B1 | 4/2003 | Codilian et al. |
| 6,549,359 B1 | 4/2003 | Bennett et al. |
| 6,549,361 B1 | 4/2003 | Bennett et al. |
| 6,560,056 B1 | 5/2003 | Ryan |
| 6,568,268 B1 | 5/2003 | Bennett |
| 6,574,062 B1 | 6/2003 | Bennett et al. |
| 6,577,465 B1 | 6/2003 | Bennett et al. |
| 6,614,615 B1 | 9/2003 | Ju et al. |
| 6,614,618 B1 | 9/2003 | Sheh et al. |
| 6,636,377 B1 | 10/2003 | Yu et al. |
| 6,690,536 B1 | 2/2004 | Ryan |
| 6,693,764 B1 | 2/2004 | Sheh et al. |
| 6,707,635 B1 | 3/2004 | Codilian et al. |
| 6,710,953 B1 | 3/2004 | Vallis et al. |
| 6,710,966 B1 | 3/2004 | Codilian et al. |
| 6,714,371 B1 | 3/2004 | Codilian |
| 6,714,372 B1 | 3/2004 | Codilian et al. |
| 6,724,564 B1 | 4/2004 | Codilian et al. |
| 6,731,450 B1 | 5/2004 | Codilian et al. |
| 6,735,041 B1 | 5/2004 | Codilian et al. |
| 6,738,220 B1 | 5/2004 | Codilian |
| 6,747,837 B1 | 6/2004 | Bennett |
| 6,757,129 B2 | 6/2004 | Kuroiwa et al. |
| 6,760,186 B1 | 7/2004 | Codilian et al. |
| 6,788,483 B1 | 9/2004 | Ferris et al. |
| 6,791,785 B1 | 9/2004 | Messenger et al. |
| 6,795,268 B1 | 9/2004 | Ryan |
| 6,819,518 B1 | 11/2004 | Melkote et al. |
| 6,826,006 B1 | 11/2004 | Melkote et al. |
| 6,826,007 B1 | 11/2004 | Patton, III |
| 6,847,502 B1 | 1/2005 | Codilian |
| 6,850,383 B1 | 2/2005 | Bennett |
| 6,850,384 B1 | 2/2005 | Bennett |
| 6,867,944 B1 | 3/2005 | Ryan |
| 6,876,508 B1 | 4/2005 | Patton, III et al. |
| 6,882,496 B1 | 4/2005 | Codilian et al. |
| 6,885,514 B1 | 4/2005 | Codilian et al. |
| 6,900,958 B1 | 5/2005 | Yi et al. |
| 6,900,959 B1 | 5/2005 | Gardner et al. |
| 6,903,894 B2 | 6/2005 | Kokami et al. |
| 6,903,897 B1 | 6/2005 | Wang et al. |
| 6,914,740 B1 | 7/2005 | Tu et al. |
| 6,914,743 B1 | 7/2005 | Narayana et al. |
| 6,920,004 B1 | 7/2005 | Codilian et al. |
| 6,924,959 B1 | 8/2005 | Melkote et al. |
| 6,924,960 B1 | 8/2005 | Melkote et al. |
| 6,924,961 B1 | 8/2005 | Melkote et al. |
| 6,934,114 B1 | 8/2005 | Codilian et al. |
| 6,934,135 B1 | 8/2005 | Ryan |
| 6,937,420 B1 | 8/2005 | McNab et al. |
| 6,937,423 B1 | 8/2005 | Ngo et al. |
| 6,952,322 B1 | 10/2005 | Codilian et al. |
| 6,954,324 B1 | 10/2005 | Tu et al. |
| 6,958,881 B1 | 10/2005 | Codilian et al. |
| 6,963,465 B1 | 11/2005 | Melkote et al. |
| 6,965,488 B1 | 11/2005 | Bennett |
| 6,967,458 B1 | 11/2005 | Bennett et al. |
| 6,967,811 B1 | 11/2005 | Codilian et al. |
| 6,970,319 B1 | 11/2005 | Bennett et al. |
| 6,972,539 B1 | 12/2005 | Codilian et al. |
| 6,972,540 B1 | 12/2005 | Wang et al. |
| 6,972,922 B1 | 12/2005 | Subrahmanyam et al. |
| 6,975,480 B1 | 12/2005 | Codilian et al. |
| 6,977,789 B1 | 12/2005 | Cloke |
| 6,980,389 B1 | 12/2005 | Kupferman |
| 6,987,636 B1 | 1/2006 | Chue et al. |
| 6,987,639 B1 | 1/2006 | Yu |
| 6,989,954 B1 | 1/2006 | Lee et al. |
| 6,992,848 B1 | 1/2006 | Agarwal et al. |
| 6,992,851 B1 | 1/2006 | Cloke |
| 6,992,852 B1 | 1/2006 | Ying et al. |
| 6,995,941 B1 | 2/2006 | Miyamura et al. |
| 6,999,263 B1 | 2/2006 | Melkote et al. |
| 6,999,267 B1 | 2/2006 | Melkote et al. |
| 7,006,320 B1 | 2/2006 | Bennett et al. |
| 7,016,134 B1 | 3/2006 | Agarwal et al. |
| 7,023,637 B1 | 4/2006 | Kupferman |
| 7,023,640 B1 | 4/2006 | Codilian et al. |
| 7,027,256 B1 | 4/2006 | Subrahmanyam et al. |
| 7,027,257 B1 | 4/2006 | Kupferman |
| 7,035,026 B2 | 4/2006 | Codilian et al. |
| 7,046,472 B1 | 5/2006 | Melkote et al. |
| 7,050,249 B1 | 5/2006 | Chue et al. |
| 7,050,254 B1 | 5/2006 | Yu et al. |
| 7,050,258 B1 | 5/2006 | Codilian |
| 7,054,098 B1 | 5/2006 | Yu et al. |
| 7,061,714 B1 | 6/2006 | Yu |
| 7,064,918 B1 | 6/2006 | Codilian et al. |
| 7,068,451 B1 | 6/2006 | Wang et al. |
| 7,068,459 B1 | 6/2006 | Cloke et al. |
| 7,068,461 B1 | 6/2006 | Chue et al. |
| 7,068,463 B1 | 6/2006 | Ji et al. |
| 7,088,547 B1 | 8/2006 | Wang et al. |
| 7,095,579 B1 | 8/2006 | Ryan et al. |
| 7,110,208 B1 | 9/2006 | Miyamura et al. |
| 7,110,214 B1 | 9/2006 | Tu et al. |
| 7,113,362 B1 | 9/2006 | Lee et al. |
| 7,113,365 B1 | 9/2006 | Ryan et al. |
| 7,116,505 B1 | 10/2006 | Kupferman |
| 7,126,781 B1 | 10/2006 | Bennett |
| 7,158,329 B1 | 1/2007 | Ryan |
| 7,180,703 B1 | 2/2007 | Subrahmanyam et al. |
| 7,184,230 B1 | 2/2007 | Chue et al. |
| 7,196,864 B1 | 3/2007 | Yi et al. |
| 7,199,964 B2 | 4/2007 | Liu et al. |
| 7,199,966 B1 | 4/2007 | Tu et al. |
| 7,203,021 B1 | 4/2007 | Ryan et al. |
| 7,209,321 B1 | 4/2007 | Bennett |
| 7,212,364 B1 | 5/2007 | Lee |
| 7,212,374 B1 | 5/2007 | Wang et al |
| 7,215,504 B1 | 5/2007 | Bennett |
| 7,224,546 B1 | 5/2007 | Orakcilar et al. |
| 7,248,426 B1 | 7/2007 | Weerasooriya et al. |
| 7,251,098 B1 | 7/2007 | Wang et al. |
| 7,253,582 B1 | 8/2007 | Ding et al. |
| 7,253,989 B1 | 8/2007 | Lau et al. |
| 7,265,933 B1 | 9/2007 | Phan et al. |
| 7,289,288 B1 | 10/2007 | Tu |
| 7,298,574 B1 | 11/2007 | Melkote et al. |
| 7,301,717 B1 | 11/2007 | Lee et al. |
| 7,304,819 B1 | 12/2007 | Melkote et al. |
| 7,330,019 B1 | 2/2008 | Bennett |
| 7,330,327 B1 | 2/2008 | Chue et al. |
| 7,333,280 B1 | 2/2008 | Lifchits et al. |
| 7,333,290 B1 | 2/2008 | Kupferman |
| 7,339,761 B1 | 3/2008 | Tu et al. |
| 7,365,932 B1 | 4/2008 | Bennett |
| 7,388,728 B1 | 6/2008 | Chen et al. |
| 7,391,583 B1 | 6/2008 | Sheh et al. |
| 7,391,584 B1 | 6/2008 | Sheh et al. |
| 7,433,143 B1 | 10/2008 | Ying et al. |
| 7,440,210 B1 | 10/2008 | Lee |
| 7,440,225 B1 | 10/2008 | Chen et al. |
| 7,450,334 B1 | 11/2008 | Wang et al. |
| 7,450,336 B1 | 11/2008 | Wang et al. |
| 7,453,661 B1 | 11/2008 | Jang et al. |
| 7,457,071 B1 | 11/2008 | Sheh |
| 7,466,509 B1 | 12/2008 | Chen et al. |
| 7,468,855 B1 | 12/2008 | Weerasooriya et al. |
| 7,477,471 B1 | 1/2009 | Nemshick et al. |
| 7,480,116 B1 | 1/2009 | Bennett |
| 7,489,464 B1 | 2/2009 | McNab et al. |
| 7,492,546 B1 | 2/2009 | Miyamura |
| 7,495,857 B1 | 2/2009 | Bennett |
| 7,499,236 B1 | 3/2009 | Lee et al. |
| 7,502,192 B1 | 3/2009 | Wang et al. |
| 7,502,195 B1 | 3/2009 | Wu et al. |

(56) References Cited

U.S. PATENT DOCUMENTS

| | | |
|---|---|---|
| 7,502,197 B1 | 3/2009 | Chue |
| 7,505,223 B1 | 3/2009 | McCornack |
| 7,542,225 B1 | 6/2009 | Ding et al. |
| 7,548,392 B1 | 6/2009 | Desai et al. |
| 7,551,390 B1 | 6/2009 | Wang et al. |
| 7,558,016 B1 | 7/2009 | Le et al. |
| 7,573,670 B1 | 8/2009 | Ryan et al. |
| 7,576,941 B1 | 8/2009 | Chen et al. |
| 7,580,212 B1 | 8/2009 | Li et al. |
| 7,583,470 B1 | 9/2009 | Chen et al. |
| 7,595,954 B1 | 9/2009 | Chen et al. |
| 7,602,575 B1 | 10/2009 | Lifchits et al. |
| 7,616,399 B1 | 11/2009 | Chen et al. |
| 7,619,844 B1 | 11/2009 | Bennett |
| 7,626,782 B1 | 12/2009 | Yu et al. |
| 7,630,162 B2 | 12/2009 | Zhao et al. |
| 7,639,447 B1 | 12/2009 | Yu et al. |
| 7,656,604 B1 | 2/2010 | Liang et al. |
| 7,656,607 B1 | 2/2010 | Bennett |
| 7,660,067 B1 | 2/2010 | Ji et al. |
| 7,663,835 B1 | 2/2010 | Yu et al. |
| 7,675,707 B1 | 3/2010 | Liu et al. |
| 7,679,854 B1 | 3/2010 | Narayana et al. |
| 7,688,534 B1 | 3/2010 | McCornack |
| 7,688,538 B1 | 3/2010 | Chen et al. |
| 7,688,539 B1 | 3/2010 | Bryant et al. |
| 7,697,233 B1 | 4/2010 | Bennett et al. |
| 7,701,661 B1 | 4/2010 | Bennett |
| 7,710,676 B1 | 5/2010 | Chue |
| 7,715,138 B1 | 5/2010 | Kupferman |
| 7,729,079 B1 | 6/2010 | Huber |
| 7,733,189 B1 | 6/2010 | Bennett |
| 7,746,592 B1 | 6/2010 | Liang et al. |
| 7,746,594 B1 | 6/2010 | Guo et al. |
| 7,746,595 B1 | 6/2010 | Guo et al. |
| 7,760,461 B1 | 7/2010 | Bennett |
| 7,800,853 B1 | 9/2010 | Guo et al. |
| 7,800,856 B1 | 9/2010 | Bennett et al. |
| 7,800,857 B1 | 9/2010 | Calaway et al. |
| 7,839,591 B1 | 11/2010 | Weerasooriya et al. |
| 7,839,595 B1 | 11/2010 | Chue et al. |
| 7,839,600 B1 | 11/2010 | Babinski et al. |
| 7,843,662 B1 | 11/2010 | Weerasooriya et al. |
| 7,848,044 B2 | 12/2010 | Kokami et al. |
| 7,852,588 B1 | 12/2010 | Ferris et al. |
| 7,852,592 B1 | 12/2010 | Liang et al. |
| 7,864,481 B1 | 1/2011 | Kon et al. |
| 7,864,482 B1 | 1/2011 | Babinski et al. |
| 7,869,155 B1 | 1/2011 | Wong |
| 7,876,522 B1 | 1/2011 | Calaway et al. |
| 7,876,523 B1 | 1/2011 | Panyavoravaj et al. |
| 7,916,415 B1 | 3/2011 | Chue |
| 7,916,416 B1 | 3/2011 | Guo et al. |
| 7,916,420 B1 | 3/2011 | McFadyen et al. |
| 7,916,422 B1 | 3/2011 | Guo et al. |
| 7,929,238 B1 | 4/2011 | Vasquez |
| 7,961,422 B1 | 6/2011 | Chen et al. |
| 8,000,053 B1 | 8/2011 | Anderson |
| 8,031,423 B1 | 10/2011 | Tsai et al. |
| 8,054,022 B1 | 11/2011 | Ryan et al. |
| 8,059,357 B1 | 11/2011 | Knigge et al. |
| 8,059,360 B1 | 11/2011 | Melkote et al. |
| 8,072,703 B1 | 12/2011 | Calaway et al. |
| 8,077,428 B1 | 12/2011 | Chen et al. |
| 8,078,901 B1 | 12/2011 | Meyer et al. |
| 8,081,395 B1 | 12/2011 | Ferris |
| 8,085,020 B1 | 12/2011 | Bennett |
| 8,116,023 B1 | 2/2012 | Kupferman |
| 8,145,934 B1 | 3/2012 | Ferris et al. |
| 8,179,626 B1 | 5/2012 | Ryan et al. |
| 8,189,286 B1 | 5/2012 | Chen et al. |
| 8,213,106 B1 | 7/2012 | Guo et al. |
| 8,254,222 B1 | 8/2012 | Tang |
| 8,300,348 B1 | 10/2012 | Liu et al. |
| 8,315,005 B1 | 11/2012 | Zou et al. |
| 8,320,069 B1 | 11/2012 | Knigge et al. |
| 8,351,174 B1 | 1/2013 | Gardner et al. |
| 8,358,114 B1 | 1/2013 | Ferris et al. |
| 8,358,145 B1 | 1/2013 | Ferris et al. |
| 8,390,367 B1 | 3/2013 | Bennett |
| 8,432,031 B1 | 4/2013 | Agness et al. |
| 8,432,629 B1 | 4/2013 | Rigney et al. |
| 8,451,697 B1 | 5/2013 | Rigney et al. |
| 8,482,233 B2 | 7/2013 | Kuroiwa |
| 8,482,873 B1 | 7/2013 | Chue et al. |
| 8,498,076 B1 | 7/2013 | Sheh et al. |
| 8,498,172 B1 | 7/2013 | Patton, III et al. |
| 8,508,881 B1 | 8/2013 | Babinski et al. |
| 8,531,798 B1 | 9/2013 | Xi et al. |
| 8,537,486 B2 | 9/2013 | Liang et al. |
| 8,542,455 B2 | 9/2013 | Huang et al. |
| 8,553,351 B1 | 10/2013 | Narayana et al. |
| 8,564,899 B2 | 10/2013 | Lou et al. |
| 8,576,506 B1 | 11/2013 | Wang et al. |
| 8,605,382 B1 | 12/2013 | Mallary et al. |
| 8,605,384 B1 | 12/2013 | Liu et al. |
| 8,610,391 B1 | 12/2013 | Yang et al. |
| 8,611,040 B1 | 12/2013 | Xi et al. |
| 8,619,385 B1 | 12/2013 | Guo et al. |
| 8,630,054 B2 | 1/2014 | Bennett et al. |
| 8,630,059 B1 | 1/2014 | Chen et al. |
| 8,634,154 B1 | 1/2014 | Rigney et al. |
| 8,634,283 B1 | 1/2014 | Rigney et al. |
| 8,643,976 B1 | 2/2014 | Wang et al. |
| 8,649,121 B1 | 2/2014 | Smith et al. |
| 8,654,466 B1 | 2/2014 | McFadyen |
| 8,654,467 B1 | 2/2014 | Wong et al. |
| 8,665,546 B1 | 3/2014 | Zhao et al. |
| 8,665,551 B1 | 3/2014 | Rigney et al. |
| 8,670,206 B1 | 3/2014 | Liang et al. |
| 8,687,312 B1 | 4/2014 | Liang |
| 8,693,123 B1 | 4/2014 | Guo et al. |
| 8,693,134 B1 | 4/2014 | Xi et al. |
| 8,699,173 B1 | 4/2014 | Kang et al. |
| 8,711,027 B1 | 4/2014 | Bennett |
| 8,717,696 B1 | 5/2014 | Ryan et al. |
| 8,717,699 B1 | 5/2014 | Ferris |
| 8,717,704 B1 | 5/2014 | Yu et al. |
| 8,724,245 B1 | 5/2014 | Smith et al. |
| 8,724,253 B1 | 5/2014 | Liang et al. |
| 8,724,524 B2 | 5/2014 | Urabe et al. |
| 8,737,008 B1 | 5/2014 | Watanabe et al. |
| 8,737,013 B2 | 5/2014 | Zhou et al. |
| 8,743,495 B1 | 6/2014 | Chen et al. |
| 8,743,503 B1 | 6/2014 | Tang et al. |
| 8,743,504 B1 | 6/2014 | Bryant et al. |
| 8,749,904 B1 | 6/2014 | Liang et al. |
| 2007/0210858 A1* | 9/2007 | Ang .................. G05F 3/262 327/543 |
| 2009/0212729 A1 | 8/2009 | Cook |
| 2010/0035085 A1 | 2/2010 | Jung et al. |
| 2012/0284493 A1 | 11/2012 | Lou et al. |
| 2013/0120870 A1 | 5/2013 | Zhou et al. |
| 2013/0148240 A1 | 6/2013 | Ferris et al. |
| 2013/0320902 A1 | 12/2013 | Sugie |

* cited by examiner

CIRCUIT TECHNIQUE TO INTEGRATE VOICE COIL MOTOR SUPPORT ELEMENTS

BACKGROUND

1. Technical Field

Apparatuses and methods consistent with the present inventive concept relate to rotating media, and more particularly to controlling current in a voice coil motor drive circuit.

2. Related Art

Conventional Voice Coil Motor (VCM) control systems used in hard disk drives (HDDs) use resistors disposed externally to control integrated circuits for measuring VCM drive current and providing feedback to a current control loop. FIG. 1 is a diagram illustrating a conventional control circuit 100 for a voice coil motor. As illustrated in FIG. 1, the VCM 120 is electrically coupled to an H-bridge circuit 110 at a first connection terminal 112 and a second connection terminal 114. Current to operate the VCM 120 is provided by the H-bridge circuit 110 through a third connection terminal 116, a resistor 130 and the second connection terminal 114. The drive current supplied by the H-bridge circuit 110 is controlled based on an error signal 182 generated by an error amplifier 180. The error amplifier 180 generates the error signal 182 based on an input signal from a first sense amplifier 140 and an input signal from a feedback controller 170.

The drive current through the VCM 120 is measured as a voltage drop created across the resistor 130 from the third connection terminal 116 to the first connection terminal 112. The differential voltage across the resistor 130 is sensed by the first sense amplifier 140 that provides an input signal to the error amplifier 180 and by a second sense amplifier 150 that provides an input signal to a feedback amplifier 160. The feedback amplifier 160 provides a feedback signal 162 that closes the gain loop with the feedback controller 170. In FIG. 1, the VCM 120, resistor 130, and the first, second, and third connection terminals 112,114, 116 are external to the control circuit 100.

BRIEF DESCRIPTION OF THE DRAWINGS

Aspects and features of the present inventive concept will be more apparent by describing example embodiments with reference to the accompanying drawings, in which.

DETAILED DESCRIPTION

While certain embodiments are described, these embodiments are presented by way of example only, and are not intended to limit the scope of protection. The methods and systems described herein may be embodied in a variety of other forms. Furthermore, various omissions, substitutions, and changes in the form of the example methods and systems described herein may be made without departing from the scope of protection.

Overview

Some example embodiments of the present inventive concept provide apparatuses and methods for sensing internal to an integrated circuit a drive current generated by the integrated circuit and supplied to an external circuit. One of ordinary skill in the art will appreciate that an integrated circuit includes, for example, but not limited to, electronic/electrical circuits fabricated using any integrated circuit fabrication technology, hybrid circuit fabrication technology, microelectromechanical systems fabrication technology, etc., without departing from the scope of the present inventive concept. Some circuit embodiments may be applied to integrated circuitry used to provide power in a data storage device such as a hard disk drive or a solid state hybrid disk drive. In particular, some embodiments may be applied to circuitry for controlling movement of the VCM.

Figure 1:
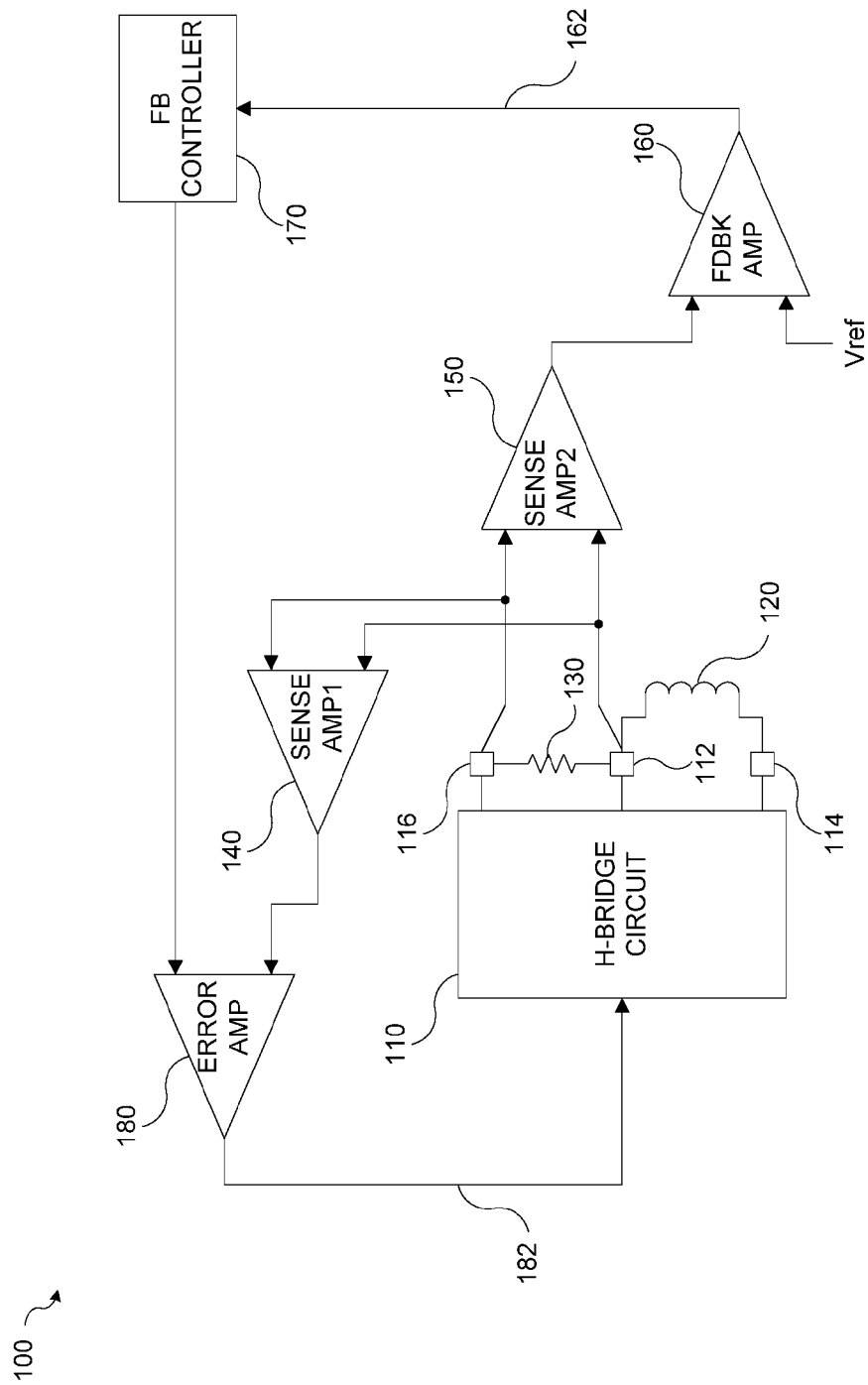
FIG. 1 is a diagram illustrating a conventional control circuit for a voice coil motor.
Figure 2:
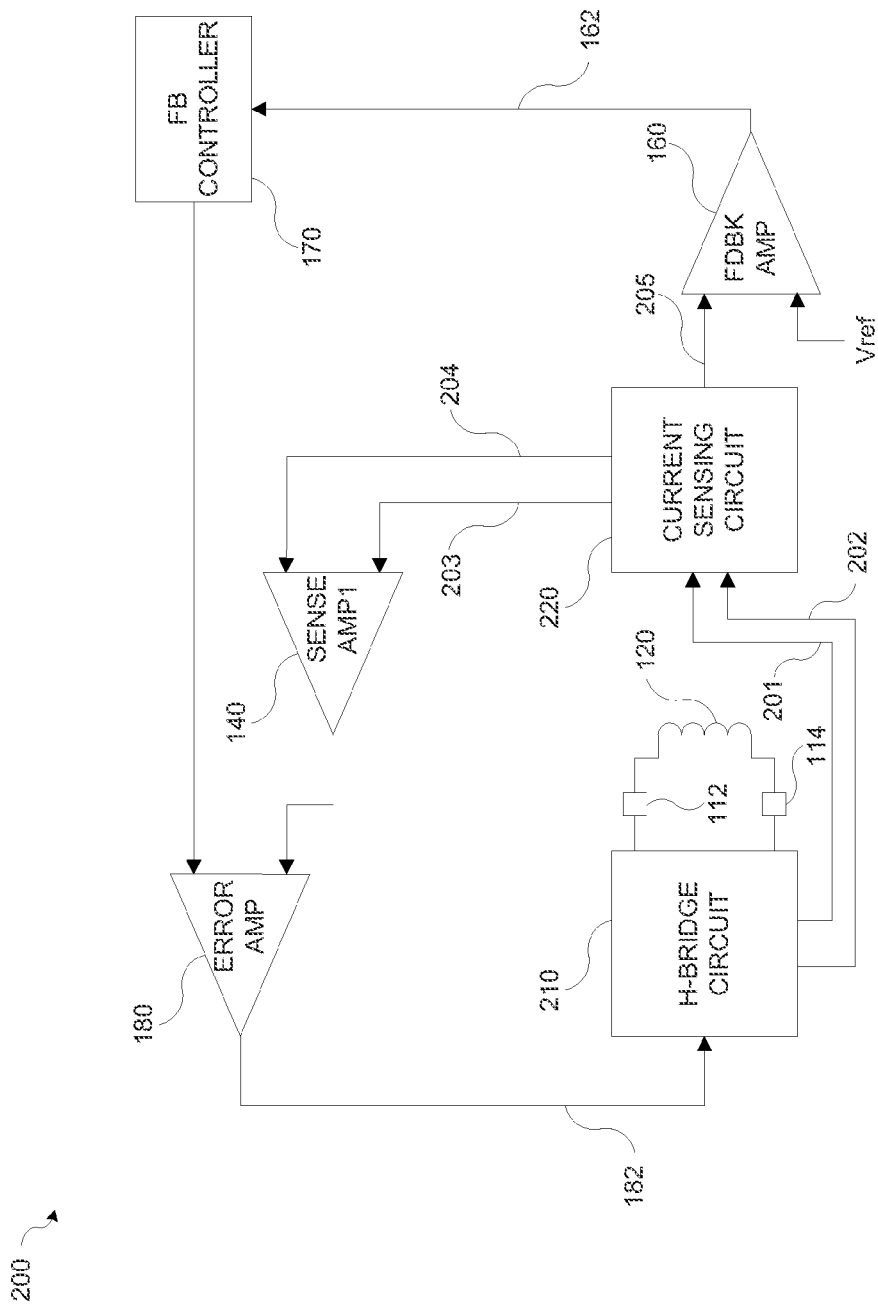
FIG. 2 is a diagram illustrating a control circuit according to example embodiments of the present inventive concept.

FIG. 2 is a diagram illustrating a control integrated circuit 200 according to example embodiments of the present inventive concept. Referring to FIG. 2, the control integrated circuit 200 may include an H-bridge circuit 210, a current sensing circuit 220, a first sense amplifier 140, a feedback amplifier 160, a feedback controller 170, and an error amplifier 180. The first sense amplifier 140, feedback amplifier 160, feedback controller 170 and error amplifier 180 provide the functions as described above with respect to FIG. 1 and will not be repeated here.

Referring again to FIG. 2, the H-bridge circuit 110 may be configured to receive an error signal 182 input from the error amplifier 180 and based on the error signal 182 provide current through a first connection terminal 112 and a second connection terminal 114 to operate a VCM 120. The VCM 120, first connection terminal 112, and second connection terminal 114 may be disposed externally to the control integrated circuit 200.

The H-bridge circuit 110 may be configured to output a first control signal 201 and a second control signal 202 to the current sensing circuit 220. The current sensing circuit 220 may be configured to input the first control signal 201 and the second control signal 202. Based on the first control signal 201 and the second control signal 202, the current sensing circuit 220 may be configured to output a first sense voltage signal 203 and a second sense voltage signal 204 to the first sense amplifier 140, and an output voltage signal 205 to the feedback amplifier 160.

In various embodiments, the H-bridge circuit 110 and the current sensing circuit 220 may be operated at different power supply voltage levels. In various embodiments, the power supply voltage level for the current sensing circuit 220 may be lower than the power supply voltage level for the H-bridge circuit 110.

H-Bridge Circuit

Figure 3:
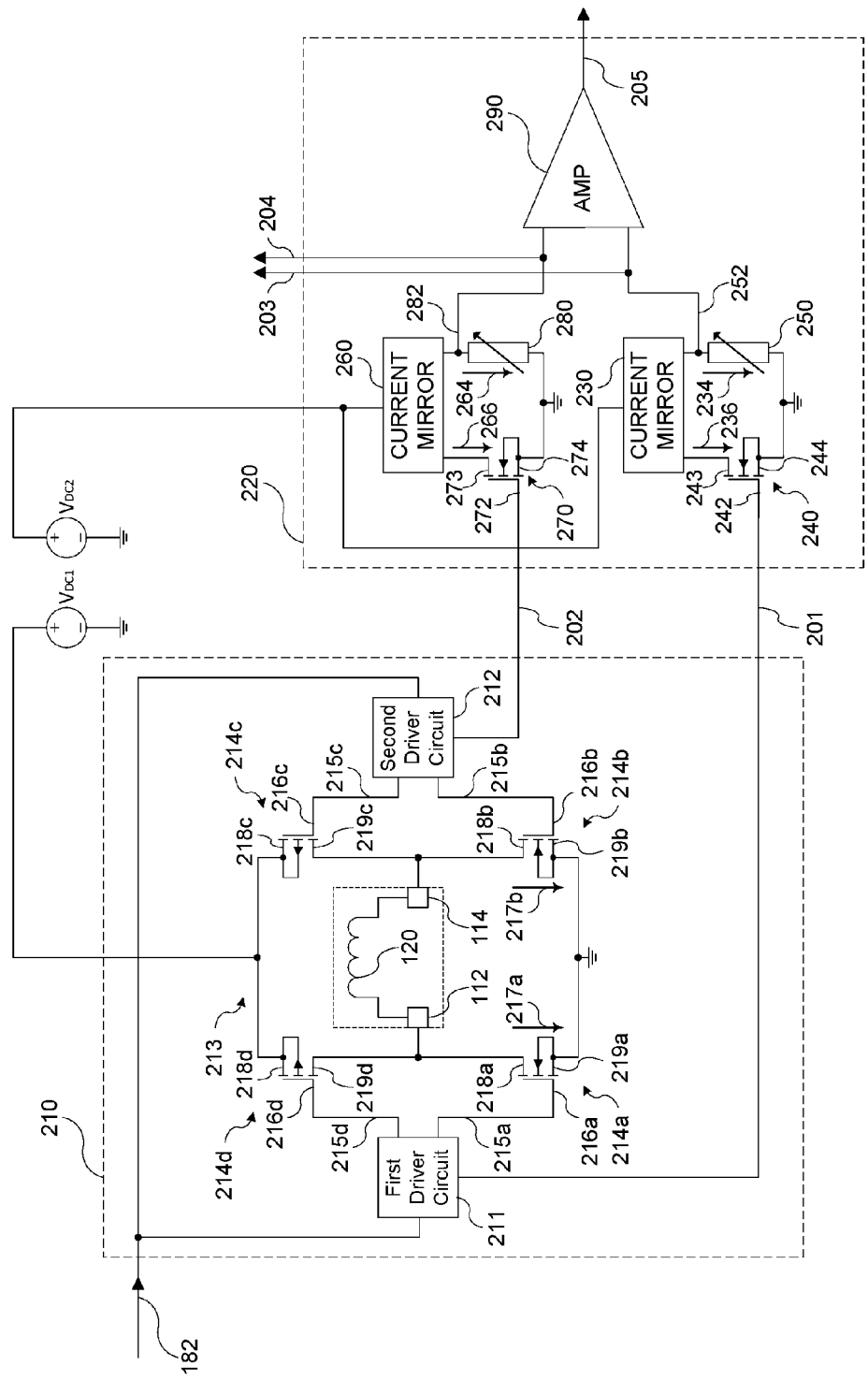
FIG. 3 is a circuit diagram illustrating an H-bridge circuit and a current sensing circuit according to example embodiments of the present inventive concept.

FIG. 3 is a circuit diagram illustrating an H-bridge circuit 210 and a current sensing circuit 220 according to example embodiments of the present inventive concept. The current sensing circuit 220 may be configured to provide current sensing and current-to-voltage conversion of the sensed current internal to the control integrated circuit 200.

The H-bridge circuit 110 may include a first controlled remote device 214a (also referred to herein as a third transistor), a second controlled remote device 214b (also referred to herein as a fourth transistor), a third controlled remote device 214c, a fourth controlled remote device 214d, a first driver circuit 211, and a second driver circuit 212.

The first controlled remote device 214a may include a first control terminal 216a, a first controlled terminal 218a, and a second controlled terminal 219a. The second controlled remote device 214b may include a first control terminal 216b, a first controlled terminal 218b, and a second controlled terminal 219b. The third controlled remote device 214c may include a first control terminal 216c, a first controlled terminal 218c, and a second controlled terminal 219c. The fourth controlled remote device 214d may include a first control terminal 216d, a first controlled terminal 218d, and a second controlled terminal 219d.

One of the controlled terminals 218a, 219a of the first controlled remote device (also referred to herein as the third transistor) 214a may be connected to a ground potential. One of the controlled terminals 218b, 219b of the second controlled remote device (also referred to herein as the fourth transistor) 214b may be connected to a ground potential.

The first-fourth controlled remote devices 214a-214c may be, for example, but not limited to, Metal Oxide Semiconductor Field Effect Transistors (MOSFETs), Insulated Gate Field Effect Transistors (IGFETs), Bipolar Junction Transistors (BJTs), or other devices capable of operation as switching devices.

The first driver circuit 211 may be configured to receive the error signal 182 and, based on the error signal 182, output a first drive signal 215a (also referred to herein as a third control signal) to a control terminal 216a of the first controlled remote device 214a and output a fourth drive signal 215d to a control terminal 216d of the fourth controlled remote device 214d. The first driver circuit 211 may be configured to generate the first control signal 201. The first control signal 201 may be substantially proportional to the first drive signal 215a.

The second driver circuit 212 may be configured to receive the error signal 182 and, based on the error signal 182, output a second drive signal 215b (also referred to herein as a fourth control signal) to a control terminal 216b of the second controlled remote device 214b and output a third drive signal 215c to a control terminal 216c of the third controlled remote device 214c. The second driver circuit 212 may be configured to generate the second control signal 202. The second control signal 202 may be substantially proportional to the second drive signal 215b.

The first-fourth drive signals 215a-215d generated by the first and second driver circuits 211, 212 may control the first-fourth controlled remote devices 214a-214d to turn on and turn off in an appropriate sequence to provide current for VCM 120 operation. Based on the first drive signal 215a, a first current 217a may flow through the first and second controlled terminals 218a, 219a of the first controlled remote device 214a when the first controlled remote device 214a is in the on state. Based on the second drive signal 215b, a second current 217b may flow through the first and second controlled terminals 218b, 219b of the second controlled remote device 214b when the second controlled remote device 214b is in the on state.

Current Sensing Circuit

The current sensing circuit 220 may include a first current mirror 230, a second current mirror 260, a first controlled device 240 (also referred to herein as a first transistor), a second controlled device 270 (also referred to herein as a second transistor), a first load device 250, a second load device 280, and an amplifier 290.

The first controlled device 240 may include a first control terminal 242, a first controlled terminal 243, and a second control terminal 244. The second controlled device 270 may include a first control terminal 272, a first controlled terminal 273, and a second control terminal 274. One of the first and second controlled terminals 243, 244 of the first controlled device (also referred to herein as the first transistor) 240 may be connected to a ground potential. One of the controlled terminals 273, 274 of the second controlled device (also referred to herein as the second transistor) 270 may be connected to a ground potential.

The first and second controlled devices 240, 270 may be, for example, but not limited to, Metal Oxide Semiconductor Field Effect Transistors (MOSFETs), Insulated Gate Field Effect Transistors (IGFETs), Bipolar Junction Transistors (BJTs), etc.

The first controlled device 240 (also referred to herein as the first transistor) may be a geometrically scaled replica of the first controlled remote device 214a (also referred to herein as the third transistor). The second controlled device 270 (also referred to herein as the second transistor) may be a geometrically scaled replica of the second controlled remote device 214b (also referred to herein as the fourth transistor).

The first current mirror 230 may be configured to generate a first mirror current 234 based on a first control current 236. The first mirror current 234 may be proportional to the first control current 236. The second current mirror 260 may be configured to generate a second mirror current 264 based on a second control current 266. The second mirror current 260 may be proportional to the second control current 264.

The amplifier 290 may be configured to generate an output voltage signal 205 based on a voltage produced by the first mirror current 234 and a voltage produced by the second mirror current 264.

The first load device 250 may be a resistive device. The second load device 280 may be a resistive device. The resistance values of the first load device 250 and the second load device 280 may be trimmable by methods known to those skilled in the art.

The current sensing circuit 220 may be configured to receive the first control signal 201 and the second control signal 202 from the H-bridge circuit 110. The first control signal 201 may be applied to the first controlled device 240 and the second control signal 202 may be applied to the second controlled device 270. The first control signal 201 may be applied to the control terminal 242 of the first controlled device 240 (also referred to herein as the first transistor). The second control signal 202 may be applied to the control terminal 272 of the second controlled device 270 (also referred to herein as the second transistor).

The first control signal 201 may be proportional to the first drive signal 215a (also referred to herein as the third control signal) applied to the first controlled remote device 214a. The second control signal 202 may be proportional to the second drive signal 215b (also referred to herein as the fourth control signal) applied to the second controlled remote device 214b.

Based on the first control signal 201, the first controlled device 240 may cause a first control current 236 to flow in the first current mirror 230 and through the first and second controlled terminals 243, 244 of the first controlled device 240. Since the first control signal 201 applied to the first controlled device 240 may be proportional to the first drive signal 215a applied to the first controlled remote device 214a and the first controlled device 240 may be a scaled replica of the first controlled remote device 214a, the first controlled device 240 (also referred to herein as the first transistor) may cause the first control current 236 to be proportional to the first remote current 217a flowing through the first and second controlled terminals 218a, 219a of the first controlled remote device 214a (also referred to herein as the third transistor).

The first mirror current 234 may be proportional to the first control current 236 and therefore may be proportional to the first remote current 217a. The first mirror current 234 may flow through the first load device 250 causing a voltage drop across the first load device 250. Since the first mirror current 234 may be proportional to the first remote current 217a, the voltage drop across the first load device 250 may be substantially proportional to the first remote current 217a.

Based on the second control signal 202, the second controlled device 270 may cause a second control current 266 to flow in the second current mirror 260 and through the first and second controlled terminals 273, 274 of the second controlled device 270. Since the second control signal 202 applied to the second controlled device 270 may be proportional to the second drive signal 215b applied to the second controlled remote device 214b and the second controlled device 270 may be a scaled replica of the second controlled remote device 214b, the second controlled device 270 (also referred to herein as the second transistor) may cause the second control current 266 to be proportional to the second remote current 217b flowing through the first and second controlled terminals 218b, 219b of the second controlled remote device 214b (also referred to herein as the fourth transistor).

The second mirror current 264 may be proportional to the second control current 266 and therefore may be proportional to the second remote current 217b. The second mirror current 264 may flow through the second load device 280 causing a voltage drop across the second load device 280. Since the second mirror current 264 may be proportional to the second remote current 217b, the voltage drop across the second load device 280 may be substantially proportional to the first remote current 217b.

The amplifier 290 may be configured to sense a voltage drop 252 across the first load device 250 produced by the first mirror current 234 flowing through the first load device 250 and a voltage drop 282 across the second load device 280 produced by the second mirror current 264 flowing through the second load device 280, and generate an output voltage signal 205 that may be substantially proportional to the difference between the sensed voltage drop 252 across the first load device 250 and the sensed voltage drop 282 across the second load device 280. A first sensed voltage signal 203 and a second sensed voltage signal 204 may be provided to the first sense amplifier 140.

Since the first mirror current 234 may be substantially proportional to the first remote current 217a and the second mirror current 264 may be substantially proportional to the second remote current 217b, the output voltage signal 205 of the amplifier 290 may be substantially proportional to the first remote current 217a and the second remote current 217b.

Figure 4:
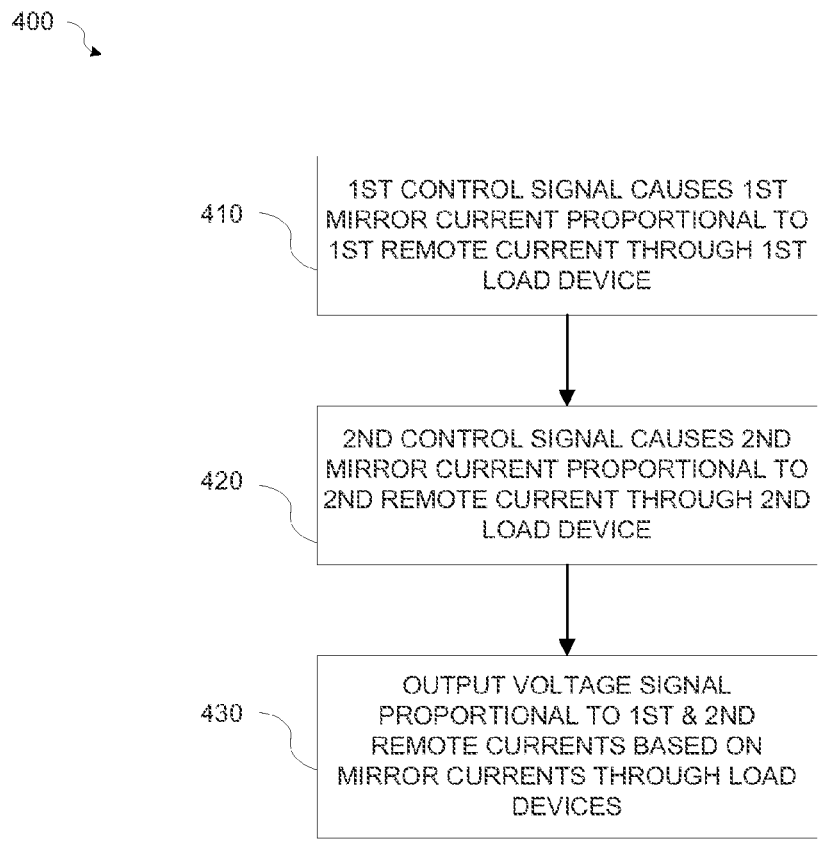
FIG. 4 is a flow chart illustrating a method according to example embodiments of the present inventive concept.

FIG. 4 is a flow chart illustrating a method 400 according to example embodiments of the present inventive concept. Referring to FIGS. 3 and 4, a first control signal 201 may cause a first mirror current 234 that is substantially proportional to a first remote current 217a to flow through a first load device 250 (410). The first control signal 201 may be proportional to a first drive signal 215a applied to a first controlled remote device 214a. The first mirror current 234 may be controlled with a first control current 236 that is proportional to the first remote current 217a. The first drive signal 215a may be applied to a control terminal 216a of the first controlled remote device 214a.

A second control signal 202 may cause a second mirror current 264 that is substantially proportional to a second remote current 217b to flow through a second load device 280 (420). The second control signal 202 may be proportional to a second drive signal 215b applied to a second controlled remote device 214b. The second mirror current 264 may be controlled with a second control current 266 that is proportional to the second remote current 217b. The second drive signal 215b may be applied to a control terminal 216b of the second controlled remote device 214b.

An output voltage signal 205 may be generated that is substantially proportional to a difference between the first remote current 217a and the second remote current 217b based on the first mirror current 234 flowing through the first load device 250 and the second mirror current 264 flowing through the second load device 280 (430).

While certain embodiments have been described, these embodiments have been presented by way of example only, and are not intended to limit the scope of the protection. The methods and systems described herein may be embodied in a variety of other forms. Various omissions, substitutions, and/or changes in the form of the example methods and systems described herein may be made without departing from the spirit of the protection.

The accompanying claims and their equivalents are intended to cover such forms or modifications as would fall within the scope and spirit of the protection. For example, the example circuits, systems, and methods disclosed herein can be applied to power control circuitry in electronic devices, such data storage devices including hard disk drives, hybrid hard drives, and the like. As another example, the various components illustrated in the figures may be implemented as circuitry on a processor, ASIC/FPGA, or dedicated hardware. Also, the features and attributes of the specific example embodiments disclosed above may be combined in different ways to form additional embodiments, all of which fall within the scope of the present disclosure.

Although the present disclosure provides certain example embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

What is claimed is:

1. A current sensing circuit, comprising:
a first controlled device;
a first current mirror configured to cause a first mirror current to flow through a first load device based on a first control signal received by the first controlled device;
a second controlled device;
a second current mirror configured to cause a second mirror current to flow through a second load device based on a second control signal received by the second controlled device; and
an amplifier configured to output a voltage signal based on the first mirror current flowing through the first load device and the second mirror current flowing through the second load device,
wherein:
the first control signal is substantially proportional to a first drive signal applied to a first controlled remote device, and
the second control signal is substantially proportional to a second drive signal applied to a second controlled remote device.

2. The circuit of claim 1, wherein:
the first drive signal is applied to a control terminal of the first controlled remote device, and
the second drive signal is applied to a control terminal of a second controlled remote device.

3. The circuit of claim 1, wherein:
the first controlled device is a geometrically scaled replica of the first controlled remote device and is configured to generate a first control current in the first current mirror that is substantially proportional to a first remote current through the first controlled remote device resulting from the first drive signal, and the second controlled device is a geometrically scaled replica of the second controlled remote device and is configured to generate a second control current in the second current mirror that is substantially proportional to a second remote current through the second controlled remote device resulting from the second drive signal.

4. The circuit of claim 3, wherein:
the first mirror current is substantially proportional to the first remote current, and
the second mirror current is substantially proportional to the second remote current.

5. The circuit of claim 1, wherein the amplifier is further configured to:
sense a voltage difference between a voltage drop across the first load device caused by the first mirror current and a voltage drop across the second load device caused by the second mirror current, and
generate an output voltage signal that is substantially proportional to the sensed voltage difference.

6. The circuit of claim 5, wherein the output voltage signal of the amplifier is substantially proportional to a difference between a first remote current and a second remote current.

7. The circuit of claim 1, wherein the first load device and the second load device are trimmable resistive devices.

8. The circuit of claim 1, wherein:
the first controlled device and the first controlled remote device are geometrically scaled replicas, and
the second controlled device and the second controlled remote device are geometrically scaled replicas.

9. The circuit of claim 1, wherein the first controlled device, the second controlled device, the first controlled remote device, and the second controlled remote device comprise MOSFETs.

10. Power control circuitry for a data storage device, the power control circuitry comprising the circuitry of claim 1.

11. A data storage device, comprising:
a voice coil motor (VCM); and
the power control circuitry of claim 10,
wherein the power control circuitry further comprises a VCM control system configured to control the movement of the VCM.

12. A method for sensing current in a circuit, the method comprising:
causing a first mirror current to flow through a first load device based on a first control signal;
causing a second mirror current to flow through a second load device based on a second control signal; and
outputting a voltage signal based on the first mirror current flowing through the first load device and the second mirror current flowing through the second load device,
wherein:
the first control signal is proportional to a first drive signal applied to a first controlled remote device,
the second control signal is proportional to a second drive signal applied to a second controlled remote device, and
the output voltage signal is substantially proportional to a difference between a first remote current flowing through the first controlled remote device and a second remote current flowing through the second controlled remote device.

13. The method of claim 12, wherein:
the first drive signal is applied to a control terminal of the first controlled remote device, and
the second drive signal is applied to a control terminal of the second controlled remote device.

14. The method of claim 12, further comprising:
controlling the first mirror current with a first control current that is proportional to the first remote current flowing through the first controlled remote device resulting from the first drive signal, and
controlling the second current mirror with a second control current that is proportional to a second remote current flowing through the second controlled remote device resulting from the second drive signal.

15. The method of claim 14 wherein:
the first mirror current is substantially proportional to the first remote current, and
the second mirror current is substantially proportional to the second remote current.

16. The method of claim 12, further comprising:
sensing a voltage difference between a voltage drop across the first load device caused by the first mirror current and a voltage drop across the second load device caused by the second mirror current; and
generating an output voltage signal that is substantially proportional to the sensed voltage difference.

17. The method of claim 16, wherein the output voltage signal is substantially proportional to a difference between the first remote current and the second remote current.

18. Power control circuitry for circuit for sensing current in an H-bridge, the power control circuitry comprising the circuitry of claim 16.

19. A circuit for sensing current in an H-bridge, comprising:
a voice coil motor (VCM); and
the power control circuitry of claim 18,
wherein the power control circuitry further comprises a VCM control system configured to control the movement of the VCM.

20. A circuit for sensing current in an H-bridge, the circuit comprising:
a first transistor configured to provide a first control current based on a first control signal applied to a control terminal of the first transistor;
a first current mirror configured to cause a first mirror current proportional to the first control current to flow through a first load device;
a second transistor configured to provide a second control current based on a second control signal applied to a control terminal of the second transistor;
a second current mirror configured to cause a second mirror current proportional to the second control current to flow through a second load device; and
an amplifier configured to sense a voltage difference between a voltage drop across the first load device and a voltage drop across the second load device, and generate an output voltage signal that is proportional to the sensed voltage difference,
wherein the first mirror current is proportional to a first current through controlled terminals of a third transistor in the H-bridge, and
the second mirror current is proportional to a second current through controlled terminals of a fourth transistor in the H-bridge.

21. The circuit of claim 20, wherein the output voltage signal is proportional to a difference between the first current through the controlled terminals of the third transistor in the H-bridge and the second current through the controlled terminals of the fourth transistor in the H-bridge.

22. The circuit of claim 20, wherein one of the controlled terminals of the third transistor in the H-bridge and one of the controlled terminals of the fourth transistor in the H-bridge are connected to a ground potential.

23. The circuit of claim 20, wherein:
  the first transistor and the third transistor are geometrically scaled replicas, and
  the second transistor and the fourth transistor are geometrically scaled replicas.

24. The circuit of claim 23, wherein the first transistor, the second transistor, the third transistor, and the fourth transistor comprise MOSFETs.

25. The circuit of claim 23, wherein the first control signal applied to the control terminal of the first transistor is proportional to a third control signal applied to the third transistor in the H-bridge, and
  the second control signal applied to the control terminal of the second transistor is proportional to a fourth control signal applied to the fourth transistor in the H-bridge.

26. The circuit of claim 25, wherein:
  the third control signal is applied to a control terminal of the third transistor in the H-bridge, and
  the fourth control signal is applied to a control terminal of the fourth transistor in the H-bridge.

27. The circuit of claim 20, wherein the first load device and the second load device are trimmable resistive devices.

\* \* \* \* \*